United States Patent [19]

Turchi

[11] 4,346,420
[45] Aug. 24, 1982

[54] MAGNETOPLASMADYNAMIC SWITCH

[75] Inventor: Peter J. Turchi, Alexandria, Va.

[73] Assignee: The United States of America as represented by the Secretry of the Navy, Washington, D.C.

[21] Appl. No.: 153,987

[22] Filed: May 28, 1980

[51] Int. Cl.$^3$ .............................................. H02H 3/00
[52] U.S. Cl. .................................... 361/4; 313/231.31; 361/8; 361/13
[58] Field of Search ........................ 361/3, 4, 8, 13; 313/231.3, 197, 230

[56] References Cited

U.S. PATENT DOCUMENTS

| | | | |
|---|---|---|---|
| 2,873,400 | 2/1959 | Cook | 313/231.3 |
| 3,523,209 | 8/1970 | Ohkawa | 313/231.3 X |
| 3,848,202 | 11/1974 | Hyne | 313/197 X |
| 4,056,836 | 11/1977 | Knaver | 361/4 |

Primary Examiner—Reinhard J. Eisenzopf
Attorney, Agent, or Firm—Robert F. Beers; William T. Ellis; Alan P. Klein

[57] ABSTRACT

A magnetoplasmadynamic switch adapted to be coupled in parallel with an inductive energy storage circuit carrying current through an initially closed circuit interrupter. The switch includes an electrode spaced by a gap from an arcjet source which is triggered by a capacitor. The capacitor is connected to the arcjet source by a closing switch so that a plasma jet is created between the source and the electrode. The voltage on the capacitor is chosen such that the arcjet source current will equal the current in the energy storage circuit at the time when the circuit interrupter has completely opened. The circuit interrupter is opened after the plasma jet is established between the source and the electrode, and the energy storage circuit current is conducted by the magnetoplasmadynamic switch until the dielectric strength of the circuit interrupter reaches a satisfactory level. Another switch is then closed providing a low impedance conduction path parallel to the arcjet source current. The arc current decays with a time constant equal to the arcjet source inductance divided by its resistance (typically several microseconds). The decay of arc current disrupts the magnetoplasmadynamic force balance, cutting off the plasma jet. Plasma already in the gap, however, continues to leave at high speed reducing the density of conducting material below that needed for high conductivity, thereby opening the switch on the timescale of gap distance divided by plasma jet speed. The current from the inductive energy storage circuit is then diverted into a parallel circuit including an inductive load.

12 Claims, 2 Drawing Figures

MAGNETOPLASMADYNAMIC SWITCH

BACKGROUND OF THE INVENTION

This invention relates generally to switches, and more specifically to a magnetoplasmadynamic switch capable of transferring large magnitudes of power.

The generation of powerful current pulses requires a convenient energy source that must store the necessary energy, and transform and deliver it at very high electromagnetic power rates (i.e., short discharge times).

Various energy sources exist, whose typical discharge times vary from submicrosecond to multisecond. Among the systems used most is the capacitor bank, becuase of its flexibility and high transfer efficiency. Inductive storage is an alternative to the capacitive storage of energy. Here a primary energy source supplies a current to a storage inductance and the stored energy is then transferred with a certain efficiency to a load inductance by increasing the impedance in a common branch until the common circuit branch is interrupted. Efficient circuit interrupters capable of carrying current for moderate periods of time, hundreds of microseconds long, and then opening in a short period of time, of a few microseconds or less, at high voltages to transfer megajoules are not believed to exist.

The reason may be understood from the following analysis. In order to transfer current to an inductive load, a voltage is required at least equal to the back Emf generated in the load. That same voltage is impressed across the circuit interrupter which is carrying current as its resistance gradually increases from $R=0$ to $R=\infty$. The product of this voltage and current represents the power dissipated in the circuit interrupter. The power dissipation occurs within the conducting path of the circuit interrupter, heating the confined low-speed or stationary gas between the contacts, and also at the boundaries of the conducting path, corroding the contacts. During the time required to transfer the current to the inductive load, if the circuit interrupter does not develop a high dielectric strength quickly enough, the dissipated power can destroy or otherwise deteriorate the elements of the circuit interrupter, in some cases preventing operation of the circuit interrupter altogether.

SUMMARY OF THE INVENTION

Accordingly, it is an object of the present invention to provide an efficient switch for transferring current to an inductive load.

Another object is to provide a switch for transforming and delivering energy to an inductive load at very high electromagnetic power rates from a storage circuit including a circuit interrupter in parallel with a storage inductor and carrying a current supplied to the storage inductor from a primary energy source.

A further object is to provide such a switch which will allow the circuit interrupter to completely open and develop a high dielectric strength before diverting current to the load and impressing the resultant high voltage across the circuit interrupter.

Yet another object is to provide such a switch capable of carrying current for moderate periods of time, tens to hundreds of microseconds long, and then opening in a short period of time of a few microseconds or less.

The objects of the present invention are achieved by a magnetoplasmadynamic switch comprising an electrode and means spaced by a gap from the electrode for jetting plasma to the electrode. Using a controlled, high-speed, directed plasma flow, the switch can create a low-impedance, current conduction path parallel to a relatively slow circuit interrupter and can then be opened quickly by interruption of the plasma flow to divert current into a parallel circuit having an inductive load, after the circuit interrupter has acquired sufficient dielectric strength to withstand the high voltage to be impressed across it. With plasma jet speeds of several cm./microseconds, the timescale for closing and opening a typical gap of several tens of cms. is a few microseconds, which is orders of magnitude faster than mechanical breakers and the like which are limited to speeds of less than several mm/microseconds.

During the bulk of time required to transfer current to the inductive load, the dissipation of energy occurs within the magnetoplasmadynamic switch, the dissipated energy being absorbed in the conducting plasma flow and carried away. Also since the magnetoplasmadynamic switch only carries current for moderate periods of time, deterioration of its electrodes is minimal.

Additional advantages and features will become apparent as the subject invention becomes better understood by reference to the following detailed description when considered in connection with the accompanying drawings, wherein:

DESCRIPTION OF THE PREFERRED EMBODIMENT

Figure 1:
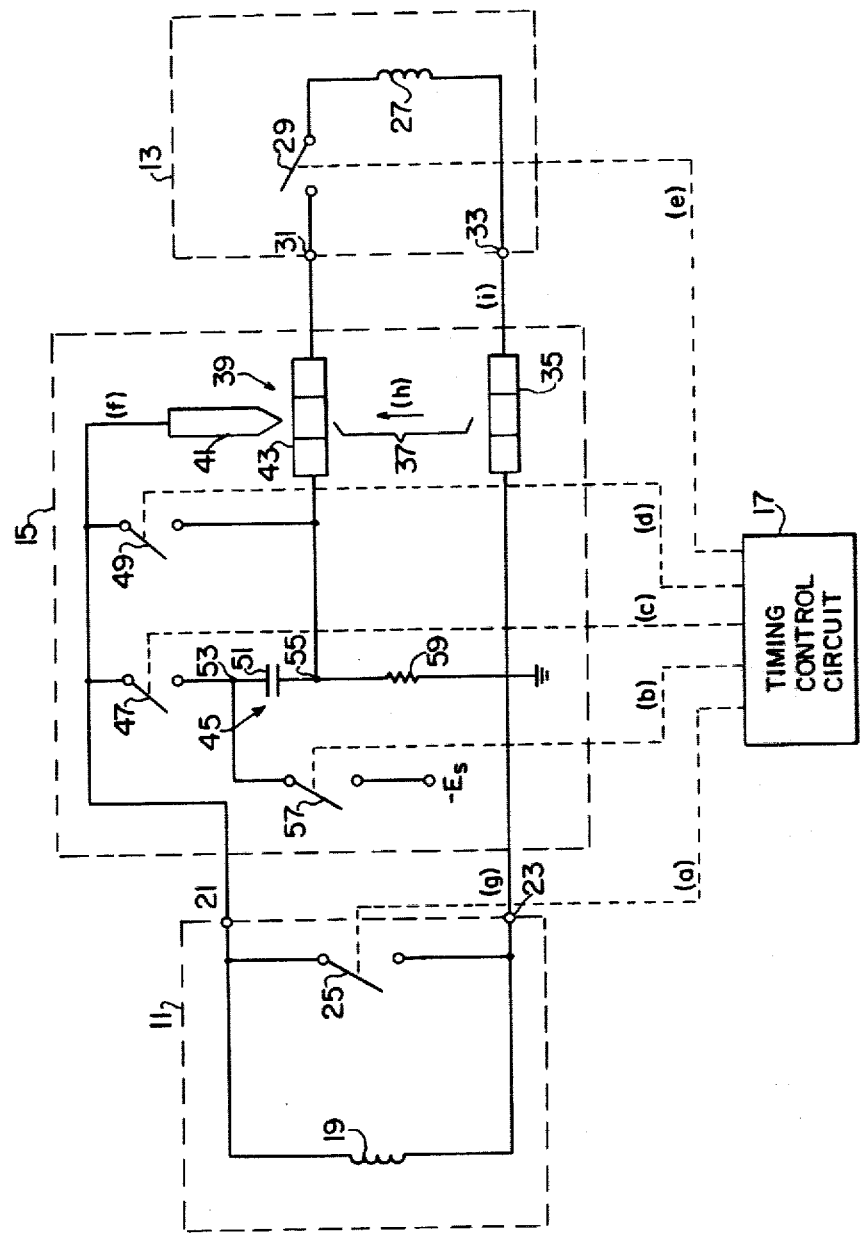
FIG. 1 is a block Diagram of an energy storage and transfer system incorporating the magnetoplasmadynamic switch according to the invention.

Referring to FIG. 1, there is shown an embodiment of an energy storage and transfer system incorporating the magnetoplasmadynamic switch according to the invention. The system is seen to include an energy storage circuit 11, a load circuit 13, the magnetoplasmadynamic switch 15 for transferring and delivering energy to the load circuit at very high electromagnetic power rates from the energy storage circuit, and a timing control circuit 17 for controlling various electronic switches in the system.

The energy storage circuit 11 includes a storage inductor 19 connected across its output terminals 21 and 23. A circuit interrupter 25, which may be, for example, a mechanical breaker or an explosive switch, is in parallel with the storage inductor 19.

The load circuit 13 is seen to include an inductive load 27 connected through an electronic switch 29 to its input terminals 31 and 33.

Initially, the electronic switch 29 is open so that the inductive load 27 is disconnected from terminals 31 and 33. Circuit interrupter 25 is closed (i.e., its resistance $R=0$) so that the storage inductor 19 and the circuit interrupter 25 form a simple series circuit. A primary energy source (not shown) such as a lead cell battery, homopolar generator or the like, supplies a current $I_{co}$ to the storage inducator 19. The initially stored energy is given by $$W_{co} = \tfrac{1}{2} L_c I_{co}^2,$$

where $L_c$ is the inductance of storage inductor 19.

In the prior art, the output terminals 21 and 23 of the energy storage circuit 11 are directly connected to the input terminals 31 and 33 of the load circuit 13. To transfer the stored energy from the energy storage circuit 11 to the load circuit 13, switch 29 is closed, and the resistance of the circuit interrupter 25 is increased in a short time interval $\Delta t$ from R=0 to R=∞, i.e., circuit interrupter 25 is opened. After $\Delta t$, the storage inductor 19 and the inductive load 27 form a simple series circuit carrying a current $I_L$. The energy transferred into the load circuit 13 is given by $W_L = (\frac{1}{2}) L_L I_L^2$, where $L_L$ is the inductance of load 27. Since the total flux linked to the circuit must remain a constant, $$I_L = I_{co}\left(\frac{L_c}{L_c + L_L}\right).$$

The energy dissipated in the circuit interrupter 25 during the opening time $\Delta t$ is given by $$W_R = W_{co} - W_c - W_L$$
$$= \text{(initially stored energy)} - \text{(energy remaining in the storage inductor)} - \text{(energy transferred into the load circuit)}$$

where $W_c = \frac{1}{2} L_c I_L^2$ is the energy remaining in the storage inductor 19, so that $$W_R = \left(\frac{L_L}{L_c + L_L}\right) W_{co}.$$

Under optimal operating conditions, ($L_C = L_L$), 50% of the initial energy is dissipated in the circuit interrupter 25. Furthermore, since the complete opening of the circuit interrupter during the time $\Delta t$ induces a mean current rise in the load 27 of $$\frac{\overline{dI_L}}{dt} \simeq \frac{I_L}{\Delta t} = \left(\frac{L_c}{L_c + L_L}\right) \frac{I_{co}}{\Delta t}$$

the voltage across both the circuit interrupter 25 and the load 27 amounts to $$V_L \simeq L_L \left(\frac{I_L}{\Delta t}\right) = \left(\frac{L_L L_c}{L_c + L_L}\right) \frac{I_{co}}{\Delta t}$$

For small opening times $\Delta t \lesssim 1$ microsecond, this means the circuit interrupter must open in the presence of large voltages and often of large currents as well, posing serious technical problems for its functioning.

As will be explained hereinafter, the magnetoplasmadynamic switch 15 provides a low-impedance path through which current can flow during $\Delta t$ so that the voltage across the circuit interrupter is greatly reduced during the initial stage of opening the circuit interrupter. This allows the circuit interrupter to open completely and develop a high dielectric strength against the subsequent high-voltage pulse in the load.

Referring again to FIG. 1, the magnetoplasmadynamic switch 15 is seen to include a pierced electrode 35 coupled between one terminal 23 of the circuit interrupter 25 and one terminal 33 of the load circuit 13. Spaced from the electrode 35 by a gap 37 and coupled between the other terminal 21 of the circuit interrupter 25 and the other terminal 31 of the load circuit 13 is a means for jetting plasma to the electrode 35 to provide a low impedance conduction path in parallel with the circuit interrupter when the energy storage circuit 11 is interrupted. While the plasma-jetting means may take a variety of forms, conveniently it may take the form illustrated in FIG. 1 of a magnetoplasmadynamic arcjet source 39 having a central, conically tipped cathode 41 and a coaxial, pierced anode 43 slightly downstream of the cathode. Cathode 41 is coupled to terminal 21 of the circuit interrupter 25, while anode 43 is coupled to terminal 31 of the load circuit 13. Arcjet sources are well known to those skilled in the art, a suitable arcjet source being disclosed, for example, in the article "Quasi-Steady Plasma Acceleration", AIAA Journal, Vol. 8 (1970) pp. 216–220, by K. E. Clark and R. G. Jahn, incorporated herein by reference. The magnetoplasmadynamic arcjet source 39 ionizes and accelerates a propellant gas by passing it through an arc discharge between cathode 41 and anode 43. The interaction of the current in the arc discharge with its own magnetic field accelerates the ionized propellant gas to create a jet of high speed plasma which exits axially through pierced electrode 43.

An arc current generator 45 is connected across the cathode 41 and the anode 43 through an electronic switch 47 to generate an underdamped arc current in the arcjet source 39. Another electronic switch 49 is connected across the cathode 41 and the anode 43, in close electrical proximity therewith, to short the arc current in the arcjet source 39. While the current generator may take a variety of forms, conveniently it may take the form illustrated in FIG. 1 of a capacitor 51, having a capacitance C, connected at one end 53 to the switch 47 and at both ends 53 and 55 to a charging means. The charging means may comprise, for example, a negative reference voltage $-E_S$ applied through an electronic switch 57 to the end 53 of the capacitor 51, and a very large resistor 59 connected between the end 55 of the capacitor 51 and grounded electrode 35. The voltage $E_S$ is selected such that the peak value of the underdamped arc current, $E_S(C/L_S)^{\frac{1}{2}}$ (where $L_S$ is the inductance of the arcjet source 39) will equal the current carried by the storage inductor 19 when the circuit interrupter 25 has completely opened. Under this condition, once the arc current reaches its peak value (after a time $\pi/2\,(L_S C)^{\frac{1}{2}}$), the energy storage circuit 11 advantageously provides all of the arc current.

The timing control circuit 17 is a conventional control circuit which may comprise, for example, transistor logic for generating the switching pulses (a), (b), (c), (d) and (e).

Now, the operation of the magnetoplasmadynamic switch will be described.

Figure 2:
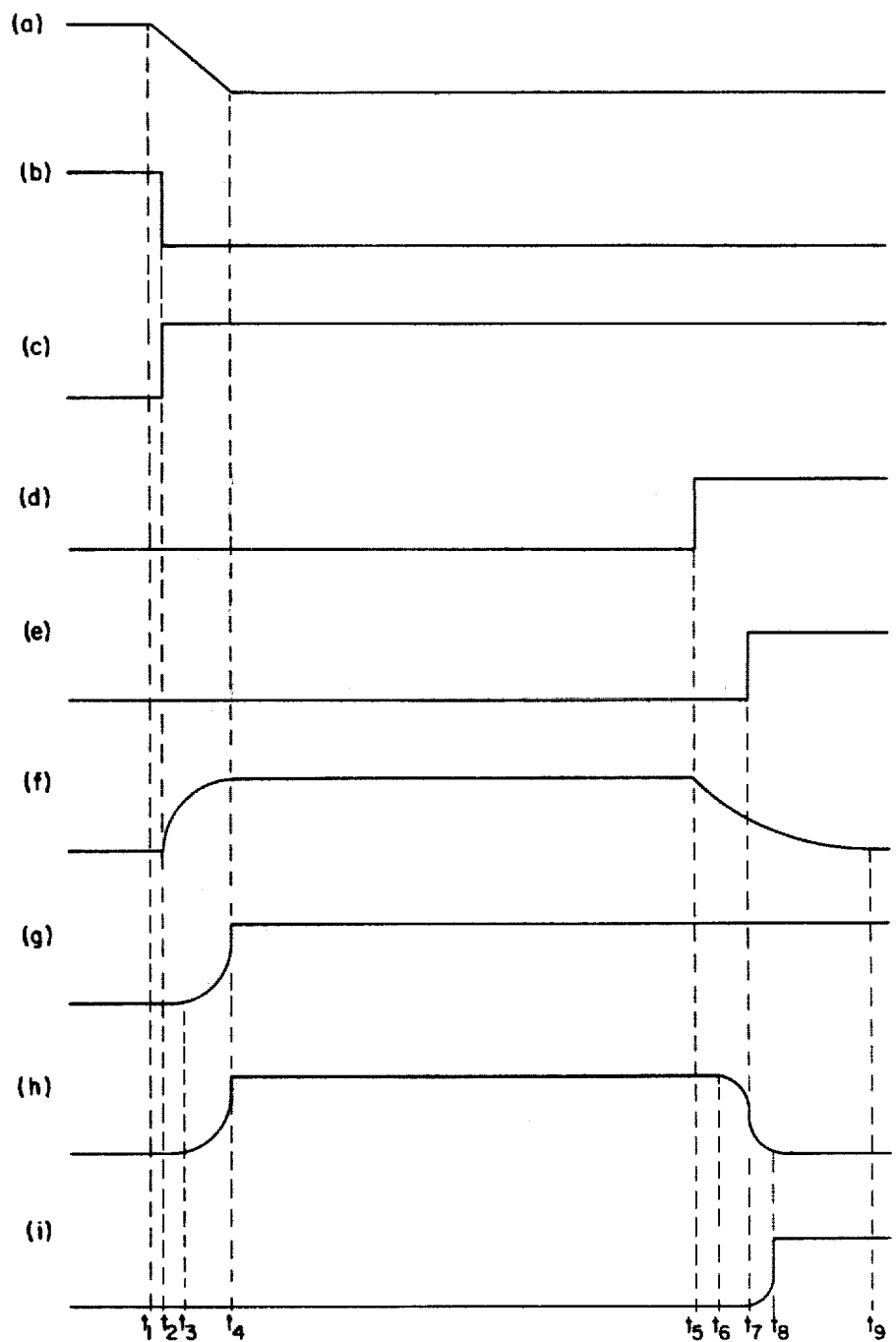
FIG. 2 is a waveform diagram for describing the operation of the magnetoplasmadynamic switch.

At time $t_1$, a switching signal as indicated by (a) in FIG. 2, is generated by the timing control circuit 17 to cause the circuit interrupter 25 to start to open (i.e., increase its resistance from R=0 to R=∞). The circuit interrupter opens until its resistance R=∞ at a time $t_4$ (of the order of several microseconds later). That is, the circuit interrupter is closed when the switching signal (a) is raised to a logical level "1". On the other hand, it is gradually opened as the switching signal is lowered to a logical level "0".

At time $t_2$, where $t_2 = t_4 - \pi/2\,(L_S C)^{\frac{1}{2}}$, a switching signal as indicated by (b) in FIG. 2 is generated by the timing control circuit 17 to open the switch 57 of the charging means which has been charging capacitor 51 through resistor 59 to a voltage $-E_S$. Also, at the time $t_2$, a switching signal, as indicated by (c) in FIG. 2 is generated by the timing control circuit 17 to close the switch 47 connecting the arc current generator 45 across the cathode 41 and the anode 43 of the arcjet source 39, thereby discharging the capacitor 51 through the inductance of the arcjet source and initiating an arc current (indicated by (f) in FIG. 2).

At time $t_5$ (about 100 microseconds later) when the circuit interrupter has acquired sufficient dielectric strength, i.e., the gas between the contacts of the circuit interrupter 25 has cooled, and the contacts are far enough apart to hold off the high voltage to be developed in the load 27, a switching signal, as indicated by (d) in FIG. 2 is generated by the timing control circuit 17 to close the switch 49, thereby causing the arc current indicated by (f) in FIG. 2 to decay while providing a short circuit for the output current from the energy storage circuit 11.

At time $t_7$ (a few microseconds later) when a sufficient voltage has developed between the anode 43 and the electrode 35 for the application of interest, a switching signal, as indicated by (e) in FIG. 2 is generated by the timing control circuit 17 to close switch 29, thereby diverting the output current from the energy storage circuit 11 as indicated by (g) in FIG. 2 to the load circuit 13 to develop the desired fast-rising pulse of voltage and current.

It will be noted that during the time interval from $t_1$ to $t_7$, the load 27 is disconnected from the circuit interrupter 25; the magnetoplasmadynamic switch 15 provides a low impedance path through which current can flow during the time interval from $t_3$ to $t_6$.

The arc current waveform is indicated by (f) in FIG. 2. The arc current is seen to be zero before time $t_2$. Between times $t_2$ and $t_4$, the arc current rises to a value $I_c$ equal to the current carried by the storage inductor 19 when the circuit interrupter 25 has completely opened. Time $t_4$ marks the end of the rise interval and the beginning of the flat top. At time $t_5$, the arc current enters its fall interval decaying with a time constant equal to $L_S/R_S$ (typically several microseconds), where $R_S$ is the arcjet source resistance. In order for the plasma jet to be maintained, the thrust of the arcjet source 39 must exceed the equilibrium centerline-pressure force in the jet caused by current conduction in the gap 37 between the anode 43 and the electrode 35 (the magnetoplasmadynamic force balance). The thrust is $F_S = (\mu/4\pi) I_S^2 K_S$ where $I_S$ is the arc current and $K_S$ is a constant (approximately equal to $\ln(r_2/r_1) + \frac{3}{4}$ for many systems, with $r_2$ and $r_1$ the radii of arc attachment on anode and cathode respectively). The peak centerline-pressure force is $F_C = (\mu/8\pi) I^2$ where $I$ is the gap current. Thus, to maintain the plasma jet, it is required that $$I_S \gtrsim I (2K_S)^{-\frac{1}{2}}.$$

Time $t_6$ marks the point at which the arc current has fallen below $(2K_S)^{-\frac{1}{2}}$ of the gap current and the plasma jet is cut off. After $t_6$, the arc current continues to fall until it reaches zero at time $t_8$, after which it remains at zero.

The energy storage circuit 11 output waveform is indicated by (g) in FIG. 2. The output current is seen to be zero before time $t_3$. At time $t_3$, the plasma jet has crossed the gap 37 to provide a low impedance conduction path, and the output current begins to rise to $I_C$.

With plasma jet speeds of several cm/microseconds created by the arcjet source 39, the time for closing the gap, $t_3 - t_2$, is a few microseconds for typical gaps of several tens of cms. Time $t_4$ marks the end of the rise interval. After time $t_4$, the output current remains at $I_C$.

The waveform of the gap 37 current is indicated by (h) in FIG. 2. The gap current is seen to be zero before time $t_3$. After time $t_3$, the gap current begins to rise to $I_C$. Time $t_4$ marks the end of the rise interval and the beginning of the flat top. At time $t_6$, when the plasma jet is cut off, the gap current enters its fall interval. After $t_6$ the gap is emptied of conducting plasma particles on a timescale of gap distance divided by plasma jet speed (a few microseconds), and the gap current decays with a time constant equal to $L_G/R_G$ where $L_G$ is the gap inductance and $R_G$ is the effective (increasing) resistance of the gap. After $t_7$, when the inductance of the load is shunted across the gap, the gap current falls at a faster rate until it reaches zero at time $t_8$, after which it remains at zero.

The load circuit current waveform is indicated by (i) in FIG. 2. The load circuit is seen to be zero before time $t_7$. Between time $t_7$ and $t_8$, the load current rises to the final value of $I_L$.

Therefore it is apparent that the disclosed magnetoplasmadynamic switch is a highly efficient means for allowing the circuit interrupter 25 to open more easily and to achieve higher dielectric strength, and for allowing a shorter rise time for the current and voltage in the inductive load 27.

Obviously, numerous modifications and variations of the present invention are possible in light of the above teachings. It is to be understood that within the scope of the appended claims, the invention may be practiced otherwise than as specifically described herein.

What is claimed as new and desired to be secured by Letters Patent of the United States is:

1. A magnetoplasmadynamic switch for transforming and delivering energy to an inductive load at very high electromagnetic power rates from a storage circuit, the storage circuit including a circuit interrupter in parallel with a storage inductor and carrying a current supplied to the storage inductor from a primary energy source, the switch comprising:
   an electrode adapted to be coupled between one terminal of the circuit interrupter and one terminal of the load; and
   means adapted to be coupled between the other terminal of the circuit-interrupter and the other terminal of the load and spaced from the electrode for jetting plasma to the electrode to provide a low impedance conduction path when the storage circuit is interrupted.

2. The switch recited in claim 1 wherein the plasma-jetting means includes:
   a magnetoplasmadynamic arcjet source having a pair of opposite polarity electrodes adapted to be respectively coupled to the other terminal of the circuit-interrupter and to the other terminal of the load.

3. The switch recited in claim 2 wherein the plasma-jetting means includes:
   an arc current generator for generating an underdamped arc current having a peak value equal to the current carried by the storage inducator when the storage circuit is fully interrupted; and first switch means for connecting the arc current generator across the opposite polarity electrodes of the arcjet source.

4. The switch recited in claim 3 wherein the arc current generator includes:

a capacitor having a capacitance C; and means for charging the capacitor to a voltage $-E_S$ such that the product $E_S(C/L_S)^{\frac{1}{2}}$ is approximately equal to the current carried by the storage inductor when the storage circuit is fully interrupted, where $L_S$ is the inductance of the arcjet source.

5. The switch recited in claim 3 wherein the plasma-jetting means includes:

second switch means for shorting the pair of opposite polarity electrodes of the arcjet source.

6. An efficient switch comprising:

an electrode;

means spaced from the electrode for jetting plasma to the electrode to provide a low impedance conduction path, the plasma-jetting means including a magnetoplasmadynamic acrjet source having a pair of opposite polarity electrodes;

an arc current generator; and first switch means for connecting the arc current generator across the opposite polarity electrodes of the arcjet source.

7. The switch recited in claim 6 wherein the arc current generator includes:

a capacitor having a capacitance C; and means for charging the capacitor to a voltage $-E_S$ such that the product $E_S(C/L_S)^{\frac{1}{2}}$ is approximately equal to the current to be carried by the switch when closed, where $L_S$ is the inductance of the arcjet source.

8. The switch recited in claim 6 wherein the plasma-jetting means includes:

second switch means for shorting the pair of opposite polarity electrodes of the arcjet source.

9. A method of transforming and delivering energy to an inductive load at very high electromagnetic power rates from a storage circuit including a circuit interrupter in parallel with a storage inductor and carrying a current supplied to the storage inductor from a primary energy source, comprising the steps of:

coupling an electrode between one terminal of the circuit interrupter and one terminal of the load;

spacing plasma-jetting means from the electrode;

coupling the plasma-jetting means between the other terminal of the circuit interrupter and the other terminal of the load;

jetting plasma to the electrode to provide a low impedance conduction path;

interrupting the storage circuit with the circuit interrupter to draw the current through the plasma jet and the plasma-jetting means, the plasma-jetting means being powered thereby; and after the circuit interrupter has achieved sufficient dielectric strength to hold off the load voltage, extinguishing the plasma jet to divert the current into the inductive load.

10. The method recited in claim 9 wherein:

the plasma-jetting means includes a magnetoplasmadynamic arcjet source having a pair of opposite polarity electrodes;

the jetting step includes generating an underdamped arc current in the arcjet source having a peak value equal to the current carried by the storage inductor when the storage circuit is fully interrupted; and the extinguishing step includes shorting the arcjet source.

11. The method recited in claim 10 wherein the generating step includes:

charging a capacitor having a capacitance C to a voltage $-E_S$; and connecting the charged capacitor across the opposite polarity electrodes of the arcjet source.

12. The method recited in claim 11 wherein the generating step includes:

selecting a charging voltage $-E_S$ such that the product $E_S(C/L_S)^{\frac{1}{2}}$ is approximately equal to the current carried by the storage inductor when the storage circuit is fully interrupted, where $L_S$ is the inductance of the arcjet source.

* * * * *